ers in which at least 10% of said
United States Patent

Whear et al.

[11] Patent Number: 6,120,939
[45] Date of Patent: Sep. 19, 2000

[54] MELTBLOWN FIBER BATTERY SEPARATOR

[75] Inventors: J. Kevin Whear, Owensboro, Ky.; Werner Bohnstedt, Henstedt-Ulzburg, Germany; Eric M. Peters, Cloverport, Ky.

[73] Assignee: Daramic, Inc., Norderstedt, Germany

[21] Appl. No.: 09/006,362

[22] Filed: Jan. 13, 1998

[51] Int. Cl.$^7$ .................................................. H01M 2/16
[52] U.S. Cl. ........................ 429/254; 429/143; 429/249; 429/250
[58] Field of Search .................. 429/143, 249, 429/254, 250

[56] References Cited

U.S. PATENT DOCUMENTS

| | | | |
|---|---|---|---|
| 3,847,676 | 11/1974 | Palmer et al. | 136/148 |
| 3,849,241 | 11/1974 | Butin et al. | 161/169 |
| 3,918,995 | 11/1975 | Palmer et al. | . |
| 3,972,759 | 8/1976 | Butin | 156/167 |
| 4,137,379 | 1/1979 | Schmidt et al. | 429/254 |
| 4,165,351 | 8/1979 | May | 264/66 |
| 4,165,352 | 8/1979 | Volkman | 264/113 |
| 5,230,949 | 7/1993 | Howard et al. | 428/224 |
| 5,414,075 | 5/1995 | Swan et al. | 568/333 |
| 5,582,903 | 12/1996 | Levy et al. | 428/219 |
| 5,723,217 | 3/1998 | Stahl et al. | 428/401 |
| 5,830,603 | 11/1998 | Oka et al. | 429/249 |
| 5,922,492 | 7/1999 | Takita et al. | 429/249 |
| 5,962,161 | 10/1999 | Zucker | 429/142 |
| 5,989,750 | 11/1999 | Ohba et al. | 429/251 |

FOREIGN PATENT DOCUMENTS 1 364 283   8/1974   United Kingdom .

*Primary Examiner*—Maria Nuzzolillo
*Assistant Examiner*—Susy Tsang
*Attorney, Agent, or Firm*—Nields, Lemack & Dingman

[57] ABSTRACT

Battery separator comprising a consolidated nonwoven mat of ultrafine polymeric fibers in which at least 10% of said fibers have a diameter less than 1 micron and which mat has an average pore size of less than 3 $\mu$m. The fiber mat is formed by meltblowing using modified conditions to produce a self-bonded web having the desired content of ultra fine fibers.

19 Claims, No Drawings

MELTBLOWN FIBER BATTERY SEPARATOR

BACKGROUND OF THE INVENTION

This invention relates to porous separators which are disposed between the electrode plates of a battery.

Batteries include a plurality of electrode plates which are arranged to provide alternating positive and negative electrodes. Separators are included in the batteries to prevent direct contact between plates of opposite polarity while freely permitting electrolytic conduction.

Battery separators are made from an insulating porous material and in general must possess certain properties. The separator medium must be resistant to degradation and instability in the environment of the battery, such as degradation e.g. by strong acid solution at ambient and elevated temperatures and strong oxidative attacks. The separator would also be capable of allowing a high degree of ionic movement, i.e. it should have a low electrical resistance. The separator would also be capable of inhibiting the formation of conductive paths between plates and consequent shorting. This latter problem can arise during battery operation when parts of the battery electrode become dispersed in the electrolyte and precipitate or become deposited in the separator.

U.S. Pat. No. 3,351,495 discloses battery separators comprising microporous sheets of filled polyolefins. The separators have a pore size which is generally less than 1 $\mu$m in diameter. They are produced by blending polyolefin, filler and plasticizer, forming said mixture into sheet form, and subsequently extracting the plasticizer from said sheet. The preferred plasticizer is petroleum oil and the removal of the plasticizer results in the formation of pores. However, the plasticizer is usually only incompletely removed by the extracting process and the remainder may cause the formation of black deposits during battery use.

Several early proposals were made to construct a separator sheet for lead acid batteries from meltblown fibers. U.S. Pat. Nos. 3,847,676, 3,870,567, 3,972,759 and 4,165,352 disclose a process in which a polypropylene resin is meltblown into fibers or filaments to form a nonwoven mat, compacted, and then treated with a surfactant. Although the inventors of the above patents have noted the importance of high porosity, small pore size, low electrical resistance, good abrasion resistance and stiffness it was also recognized that many of these properties are antagonistic to each other. That is, that if one maximizes on of these properties, one is liable to minimize one or more of the other properties. It was suggested to use separators which preferably have a pore size within the range of 7 to 20 $\mu$m and a porosity of 50 to 65%. The fibers used to produce the separators have a diameter of 0.05 to 50 microns, preferably 1 to 5 microns and 0.5 to 5 microns, respectively. These references do not indicate which proportions of fibers having a certain diameter are used. The separators typically have an electrical resistance of about 13 to 32 m$\Omega$/cm$^2$.

U.S. Pat. No. 5,126,219 discloses battery separators comprised of a web formed of a multiplicity of microporous fibers or filaments of filled ultrahigh-molecular weight polyolefin. The web has a thickness of between about 1 and 120 mils and macropores created by the interfiber or interfilament interstices. Manufacture of the filled fibers involves the use of a plasticizer which is removed after fiber formation by extraction.

GB 1,603,635 is concerned with a method of producing battery separators which involves the preparation of a furnish containing a synthetic pulp, forming a paper web from the furnish, subjecting the paper web to heat and pressure to consolidate the paper web and to emboss the paper web. The synthetic pulp is a pulp of polyolefin fibers having fibrillated structure. The separators have a maximum pore size of 50 $\mu$m and a maximum mean value of about 20 $\mu$m. The above separators have proved unsatisfactory in that they do not sufficiently prevent the growth of lead dendrites through the separator between the positive and negative plates and they have consequently not been used commercially to an appreciable extend.

SUMMARY OF THE INVENTION

The present invention provides a battery separator comprising a consolidated nonwoven mat of ultrafine polymeric fibers in which at least 10% of said fibers have a diameter less than 1 micron and which mat has an average pore size of less than 3 $\mu$m.

The fiber mat is formed by meltblowing using modified conditions to produce a self-bonded web having the desired content of ultra fine fibers.

The polymeric fibers can advantageously be combined with inorganic materials which as silica, talc or glass fibers or organic particles. These inorganic materials can be distributed homogeneously throughout the polymer fiber mat, such as in case of forming a mixture of ultrafine polymeric fibers and glass fibers into a mat or may be present in form of a separate layer such as a microfiber glass mat or a layer of silica disposed between two mats of polymeric microfibers or bound to a polymeric microfiber mat. The inorganic material or the organic particles can be added during the meltblown process in the attenuation zone or in a secondary process before hot calendering. The particles and fibers can be added to the sheet as described in U.S. Pat. No. 3,971,373, for example, the disclosure of which is hereby incorporated by reference. Preferably the average particle size of the particles is from about 2 to about 70 microns. The amount of particles added can range from about 10% to about 90% of the weight of the composite mat, more preferably from about 50–55%. The preferred particles are hydrated amorphous silica, commercially available from PPG as HIL-SIL, WB-10.

DETAILED DESCRIPTION OF THE INVENTION

The substrate of the battery separator of the present invention is formed using a conventional meltblowing apparatus. Such an apparatus typically includes a pressurized, heated die through which is plurality of filaments of molten thermoplastic polymers are extruded. The die also uses heated and pressurized air to attenuate the molten polymer upon exit from the orifices. The fibers are continuously deposited on a moving conveyor to form a nonsolidated flat web of desired thickness, which may be subjected to a compressing operation. Normally longitudinal ribs are applied and the mat is then cut into the desired width and collected in form of a roll which is simple to handle and which can easily be further processed by the battery manufacturer to form pockets.

The construction and operation of meltblown apparatus for forming a coherent mat are considered conventional, and the design and operation are well within the ability of those skilled in the art. Suitable apparatus and methods are described in U.S. Pat. Nos. 3,847,676, 3,870,567, 3,849,241 and 3,972,759, incorporated herein by reference.

The polymers used to make the substrate include thermoplastics polymers capable of being melt extruded into a submicron size diameter, and resistant to strong acids. Potential candidates include polystyrene, polyamides, polyesters and polyolefins, but polypropylene is preferred.

Recent advances in polymer technology allow more successful meltblowing of thermoplastic polymers in the submicron range. As described in PCT/US94/06017 reactor grade isostatic poly-α-olefins are available wherein polypropylene, for example, is produced by single-side catalysis and has a molecular weight distribution (MWD) in the range of 1.0 to 3.5. These polymers, sometimes referred to as metallocene catalysed polypropylene, have a narrow distribution of molecular weight.

Preferably, the resin has a low viscosity or a high melt flow rate (MFR), a MFR above 800 g/10 min, preferably 850 to 2600 g/10 min, most preferably 1200 to 2600 g/10 min. The melt flow rate is determined according to ASTM D 1238-70. In addition, the polymer melt may be treated with known visocity reducing agents such as peroxides. In order the achieve submicron sizes, the extrudate melt temperature, extrudate throughput, attenuating air temperature, air flow rate, and die to collector distance (DCD) are appropriately adjusted. Typical ranges are as follows: Melt temperature 200 to 320° C., through-put 0.1 to 2.0 g/hole/min, air temperature 170 to 400° C., air rate 300 to 800 scfm, DCD 20 to 130 cm.

While the use of a mat comprising microfine meltblown fibers in uncompressed form is possible, it is preferred to compress or compact the fiber mat after collection. The fibers are collected as a self-supporting mat on the collection device. The fibers are "self-bonded" in the mat in that the mat is coherent, integral and capable of withstanding normal handling such as winding and unwinding, cutting, pressing, calendering, etc. without loosing its essential mat-like or web-like character. In most instances, and particularly where the preferred polymers are used, some thermal or meltbonding occurs. Bonding is usually maintained predominantly through the mechanism of entanglement in the original collected web or mat. The preferred properties of the uncompressed and compressed mat are given in Table 1.

TABLE 1

Properties of meltblown fiber battery separators

| Properties (ranges) | uncompressed mat | compressed mat |
|---|---|---|
| thickness [mm] | 0.07–2.5 | 0.03–0.5 |
| preferred thickness | 0.5–1.0 | 0.15–0.3 |
| basis weight [g/m$^2$] | 6–160 | same |
| preferred basis weight | 20–120 | same |
| most preferred basis weight | 30–70 | same |

The meltblown fiber battery separators of the present invention may be prepared by producing and compressing a single mat or, preferably, by producing and compressing multiple mats the total thickness of which is within the above ranges.

The compacting operation is preferably carried out by utilizing calender rolls, however, a press may also be used to obtain a non-woven mat of desired properties. In either case, compaction using a fixed gap is preferred. The gap is preferably a fixed gap and such that the mat sees pressure of no more than 13 to 105 MPa and more preferably from 75 to 105 mPa during compaction. The setting of the gap, the size and composition of the fibers, the closest or initial compaction of the fibers, the thickness of the initial or starting mat and the thickness of the final or finish mat should be so matched up with the operation conditions that the compacted mat has the above defined void fraction or porosity and pore size. The preferred compression temperature is 20 to 140° C., more preferably 80 to 135° C. and most preferably 120 to 135° C. During compacting the thickness of the mat is decreased to 15 to 50%, preferably 20 to 30% of the initial thickness. From the above considerations, a person skilled in the art will be able to prepare a meltblown web, or mat of uniform thickness, with a distribution of fiber sizes which are necessary for a battery separator.

The fiber mats can be further processed by stretching, e.g. by pulling the web over steam cans with appropriate tension, or with conventional tentering equipment. A suitable stretching method is set forth in U.S. Pat. No. 5,582,903, the disclosure of which is hereby incorporated by reference. This stretching occurs as the mat is drawn over a set of steam cans with proper tension applied. The resultant barrier fabric is able to prevent migration of particles down to 0.1 micron. Also, the polymer mat may be heat treated for instance by IR lamps or another set of calender rolls precisely controlled at a temperature of e.g. 138° C. to heat and melt a surface layer of the mat. These methods serve to control and further decrease the pore size of the mats.

The mat or mat of fibers must contain at a minimum at least about 10% fibers having diameters of less than 1 μm. More preferably, the web will contain 10 to 40% fibers having diameters of less than 1 micron, most preferably 20 to 30% polymer fibers having a diameter of less than 1 μm. It is further preferred that the mat or mat of fibers contains at a minimum at least about 10% fibers having diameters of less than 0.5 μm, more preferably 10 to 40% fibers having diameters of less than 0.5 micron, and most preferably 20 to 30% polymer fibers having a diameter of less than 0.5 μm. Also, the average fiber diameter of fibers in the web will preferably be 0.5 to 3 μm. The above percentages are based on the fiber numbers as determined by scanning electron microscopy (SEM). For this purpose a mat is examined by SEM and the total number of fibers within a certain area as well as the number of fibers having a certain diameter are counted.

It was surprisingly found that by using a certain amount of fibers having a diameter of less than 1 μm, preferably less than 0.5 μm, separators having a BET surface area of 0.9 to 1.2 m$^2$/g and having a small average pore size of 0.1 to 3.0 μm, preferably 0.1 to 1.0μ can be obtained without negatively effecting porosity and electrical resistance of the separators. The separators of the present invention efficiently suppress the growth of dendrites and have excellent acid resistance.

The thickness and basis weight of the web will depend on, for example, the actual requirements of the battery. In general, thicknesses of the mat will be in the order of 0.05 to 0.3 mm.

In a preferred embodiment the separators are provided with a plurality of longitudinal ribs. The ribs may be formed during the compressing step or may be applied in a separate step for example by extruding a polypropylene rib onto the fiber mat. In addition to longitudinal ribs the separators may also be provided with a plurality of transverse ribs.

The separator mat has preferably an average pore size of less than 1 μm, more preferably less than 0.3 μm. It is further preferred that the mats comprise not more than 1% by volume of pores having a size greater than 10 μm. That is, not more than 1% of the void volume of the separator as determined by mercury intrusion mat is contained in pores having a diameter greater than 10 μm. More preferably not more than 1% by volume of the void volume is contained in pores greater than 3 μm and most preferably not more than 1% by volume of the void volume is contained in pores greater than 1 μm.

The resulting mats will have a porosity or void volume of greater than 50%, preferably greater than 60%, more preferably greater than 65% and most preferably greater than 70%. The porosity of the uncompressed separators is preferably greater than 90%. Pore volume and porosity are determined by mercury intrusion as described by N. M. Winslow and J. J. Shapiro in ASTM bulletin (1959) 39.

The BET fiber surface area is preferably greater than 0.9 $m^2/g$, more preferably greater than 1.1 $m^2/g$, sill more preferably greater than 1.2 $m^2/g$ and most preferably greater than 1.3 $m^2/g$.

The meltblown fabric is preferably treated to render it permanently wettable in the lead acid battery. In the preferred embodiment, a hydrophilic polymer is chemically bonded to the surface of the fiber. This may be accomplished, for example, by graft polymerizing of the substrate with a hydrophilic monomer, such as acrylic or methacrylic monomers having alcohol functional groups using radiation.

In accordance with the preferred embodiment, a hydrophilic compound such as polyvinyl pyrrolidone or polyacrylamide is immobilized on the surface of the fibers. The hydrophilic agent is either photactivatible itself or is combined with a photoactivatible cross-linking agent. The agent is coated onto the substrate and radiated. Various compounds of this nature are available from BSI Corporation, Eden Prairie, Minn. See, for example, U.S. Pat. No. 5,414,075, incorporated by reference. The term "permanently wettable" is defined herein to mean that the hydrophilic polymer is covalently bonded to the meltblown substrate and is hydrolytically stable. The application rate is in the order of 30 to 340 cm/min. The treatment of meltblown polypropylene fabrics to render them permanently wettable is described in co-pending application Ser. No. 08/783,219.

Alternatively, any of the commercially available wetting agents known to the art, such a sodium alkyl benzene sulfonate, sodium lauryl sulfate, dioctyl sodium sulfosuccinate, and isooctyl phenyl polyethoxy ethanol, can be used to enhance the wettability of the battery separator by electrolyte. These wetting agents are applied to the surface of the separator by dip coating, spraying or other suitable application methods well known to the expert in the field.

Other suitable wetting agents are disclosed in EP 0 409 363, herein incorporated by reference.

Still another class of suitable wetting agents is disclosed in U.S. Pat. Nos. 3,847,676, 3,870,567, herein incorporated by reference. These wetting agents consist of a combination of a first wetting agent which is a surfactant that is soluble in the resin of the fibers at the temperature at which the resin will be extruded and a second wetting agent that is preferably classified as relatively water soluble and relatively oil insoluble and belongs to a class of wetting agents having relatively high HLB (hydrophilic lyophilic balance) numbers as compared to that of the first wetting agent. The HLW is defined and determined as described by W. C. Griffin, Classification on Surface-Active Agents by "HLB", *Journal Soc. Cosm. Chemists,* 1 (1949) 311; W. C. Griffin, Calculation of HLB-Values of Non-Ionic Surfactants, *Journ. Soc. Cosm. Chemists* 5 (1954) 249; W. C. Griffin, Clues to Surfactant Selection offered by the HLB-System, *Official Digest Federation Paint & Varnish Prod. Clbs.* 28 (1956) 466.

The first wetting agent is preferably selected from the group consisting of $C_8$ to $C_{18}$ phenol surfactants having 1–15 moles of ethylene oxide more preferably 1–6 moles of ethylene oxide and most preferably 1–3 moles of ethylene oxide. These surfactants are relatively water insoluble but oil soluble. The first wetting agent is dispersed throughout the resin and preferably added in an amount of 0.5 to 20 percent by weight based on the weight of the resin, more preferably 1 to 10 percent by weight and most preferably 1 to 3 percent by weight.

The second wetting agent is present in form of a coating on the outer surfaces of the fibers and preferably selected from the group consisting of anionic surfactants and non-ionic surfactants and mixtures thereof. The level of the second wetting agent in the final mat is preferably in the range of 0.05 to 1.0 percent by weight.

The separator mats of the present invention typically shown an electrical resistance of less than 80 $m\Omega/cm^2$, preferably less than 50 $m\Omega/cm^2$, and puncture resistance of more than 5 N, preferably more than 8 N. The puncture resistance is the peak force required to puncture the separator with a cylindrical, flat tip of 1.93 mm (0.076 in) diameter.

The separators are especially useful in all kinds of lead acid batteries such as SLI-type (starting, lighting and ignition) and industrial type batteries.

EXAMPLE 1

Humko Chemical of American Ingredience, Atmul 124 (mono and diglycerides from fatty acids) were added to polypropylene 25% by weight. This material was mixed and extruded into filaments using a single screw extruder. After cooling in air, the polymer filaments were chopped into micropellets. These micropellets were then mixed, 25% by weight to high melt flow polypropylene powder, Exxon 3546. A meltblown mat was then produced with the following extrusion conditions:

| | |
|---|---|
| Extrudate Melt Temperature: | 250° C. |
| DCD: | 75 cm |
| Extrudate Throughput: | 0.75 grams/hole/min |
| Attenuating Air Temperature: | 290° C. |

The winder speed of the line was controlled so that the mat had a resultant basis weight of 60 $g/m^2$ and a thickness of 0.71 mm with a compression force of 2 kPa. This mat was then pulled through two calender rolls which were heated to a temperature of 115° C. The gap between the calender rolls was controlled so that the resultant thickness of the mat was approximately 25% of the original thickness or 0.19 mm. This mat was then soaked in a 2% solution of Aerosol MA-80 solution from Cytec. This compressed mat had the following characteristics:

| | |
|---|---|
| Elongation to Break | |
| Machine Direction: | 29.5% |
| Cross Machine Direction: | 41.5% |
| Electrical Resistance | |
| 10 min Water Boil/20 Acid min Soak: | 60 mohms-$cm^2$ |
| 20 min Acid Soak: | 72 mohms-$cm^2$ |
| Resistance to Puncture Force: | 5.1 Newtons |

-continued

Water Drying Shrinkage

| | |
|---|---|
| Machine Direction: | −0.49% |
| Cross Machine Direction: | −0.21% |

Acid Drying Shrinkage

| | |
|---|---|
| Machine Direction: | 0.66% |
| Cross Machine Direction: | 0.61% |

Bubble Point

| | |
|---|---|
| Mean Pore Diameter: | 2.5 microns |
| Maximum Pore Diameter: | 9.0 microns |

With this compressed mat, the polypropylene rib is then applied.

What is claimed is:

1. A battery separator for use between electrodes of a lead-acid battery, said separator comprising a nonwoven mat of thermally bonded meltblown thermoplastic polymer fibers, at least 10 percent of said fibers having a diameter of less than 1 μm as determined by SEM, said mat having an average pore size of less than 3 μm, and wherein not more than 1 percent of the void volume of said mat is comprised of pores having a size greater than 10 μm.

2. The battery separator of claim 1 wherein said mat contains 10 to 40 percent polymer fibers having a diameter of less than 1 μm.

3. The battery separator of claim 1 wherein said polymer fibers in said mat have a diameter of less than 0.5 μm.

4. The battery separator of claim 1 wherein said mat has an average pore size of less than 1 μm.

5. The battery separator of claim 1 wherein said mat is provided with a plurality of longitudinal ribs.

6. The battery separator of claim 1 wherein not more than 1 percent of the void volume of said mat is comprised of pores having a size greater than 3 μm.

7. The battery separator of claim 1 wherein said mat has a porosity of more than 50 percent.

8. The battery separator of claim 1 wherein said mat has a porosity of more than 70 percent.

9. The battery separator of claim 1 wherein said mat has a thickness of 0.05 to 0.3 mm.

10. The battery separator of claim 1 wherein said polymer fibers in said mat have a surface area greater than 0.9 $m^2/g$.

11. The battery separator of claim 1 wherein said polymer fibers in said mat have a surface area greater than 1.3 $m^2/g$.

12. The battery separator of claim 1 wherein said polymer is polypropylene.

13. The battery separator of claim 12 wherein said polypropylene is metallocene catalyzed polypropylene having a molecular weight distribution of 1.0 to 3.5.

14. The battery separator of claim 1 wherein said fibers are treated with an agent to render them permanently wettable in acid.

15. The battery separator of claim 14 wherein said agent is a hydrophilic polymer chemically bonded to said polymer fibers.

16. The battery separator of claim 15 wherein said hydrophilic polymer is photoactivatible.

17. The battery separator of claim 14 wherein said agent comprises polyvinyl pyrrolidone.

18. The battery separator of claim 14 wherein said agent comprises polyacrylamide.

19. The battery separator of claim 1 wherein the separator comprises a first wetting agent that is soluble in the resin of the fibers at the temperature at which the resin is extruded and which is dispersed through the resin and a coating on their outer surfaces of a second wetting agent that is water soluble.

* * * * *